Jan. 17, 1950 C. P. AGER 2,494,532
TEMPLATE HOLDER
Filed April 20, 1945 2 Sheets-Sheet 2

INVENTOR.
CLARENCE P. AGER
BY
Ralph L Chappell
ATTORNEY.

Patented Jan. 17, 1950

2,494,532

UNITED STATES PATENT OFFICE 2,494,532

TEMPLATE HOLDER

Clarence P. Ager, Bremerton, Wash.

Application April 20, 1945, Serial No. 589,436

4 Claims. (Cl. 266—23)

(Granted under the act of March 3, 1883, as amended April 30, 1928; 370 O. G. 757)

This invention relates to template holders and more particularly to those adapted to be used in cutting machines of the flame type having a movable cutting flame element in which the path of movement of the element is controlled by a magnetic roller acting on a template, as exemplified by the machines known commercially as "Omnigraphs" or "Camographs."

The die holders heretofore used in cutting machines of the type referred to support the template in fixed relation to the machine, once the machine is set up for use. This arrangement has certain disadvantages. For example, before the machine can start a cut, it is necessary for the operator either to make a hand cut through the salvage material to the outline of the shape that is to be cut by the machine, or drill a hole through the salvage material adjacent the outline of the shape. When either of these methods of starting a cut is employed, there is a relatively abrupt change of direction of cutting at the point where the machine commences to cut. Such change of direction produces a "starting nick" in the edge of the cut shape at the point of change and it is necessary to remove this nick in a subsequent machining operation. Furthermore, after each cutting operation, it is necessary either to move the machine, or to move the material being cut, in order to cut another shape from the material.

Important objects of the present invention are, therefore, to overcome the disadvantages heretofore encountered; to provide a template holder in which a template held thereby may be moved in certain definite paths to start a cut without the necessity either of hand cutting or of drilling in the salvage material, and which supports a plurality of dies adapted to be moved selectively to position to cooperate with the roller in making a cut, whereby a plurality of shapes may be cut from a piece of material without the necessity of moving either the machine or the material after each cut.

Other objects of my invention are to provide a template holder adapted to be used in cutting machines of the type referred to and which eliminates the need for hand cutting or drilling in the salvage material to start a cut; to provide a template holder which eliminates the "starting nick" in the edge of a shape cut by the machine; to provide a template holder which enables a plurality of shapes to be cut from a piece of material without the necessity of moving either the machine or the material after each cut is made; and to provide a template holder which is adapted to cut shapes with less wastage in the form of salvage material.

It is a further object of my invention to provide a template holder which is easily installed in existing equipment to replace template holders of types heretofore known.

In accomplishing these and other objects of the present invention, I have provided improved details of structure, the preferred form of which is illustrated in the accompanying drawings, wherein.

Figure 1:
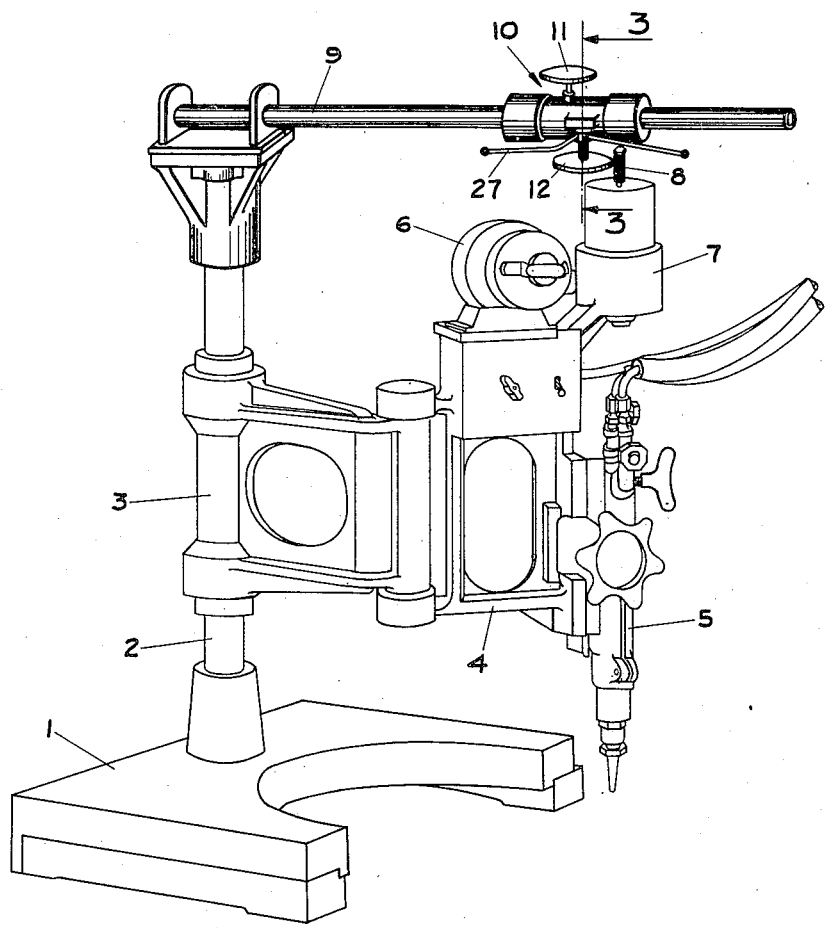
Fig. 1 is a perspective view of a flame cutting machine with a template holder embodying my invention installed therein.

Referring more in detail to the drawings:

Fig. 1 shows a flame cutting machine of a known type with the template holder of my invention installed therein. It is to be understood that the machine shown in Fig. 1 is merely illustrative of the type of machine in which my invention may be employed. The latter is adapted to be applied to any cutting machine that operates on similar principles.

The machine shown in Fig. 1 comprises a base 1. An upright standard 2 is rigidly secured at its lower end to the base 1. A laterally extending arm 3 is hinged to the upright 2 above the base and a second arm 4 is hinged to the outer end of the arm 3, both axes of hinging being substantially vertical. The arm 4 carries a flame cutting element 5 which may be of the oxyacetylene type and which is vertically adjustable thereon. The arm 4 also carries a motor 6, a set of reduction gears 7 driven by the motor, and a follower in the form of a roller 8 driven by the motor through the reduction gears. The roller 8 is an electro-magnet. When it is energized and rotated, it is held tightly against a template and follows the contour of the template throughout its periphery. The cutting element 5 thus describes a path identical to the outline of a template of any shape provided therefore.

The machine also comprises a third arm 9 secured to the upright 2 adjacent the upper end thereof and extending laterally therefrom.

The template holder of my invention, designated generally as 10, is secured to the arm 9. The template holder supports templates 11 and 12, either of which may be moved selectively to a position to cooperate with the roller 8 and may be moved longitudinally of the arm 9 through a predetermined distance by mechanism and for purposes which I will hereinafter explain.

Figure 2:
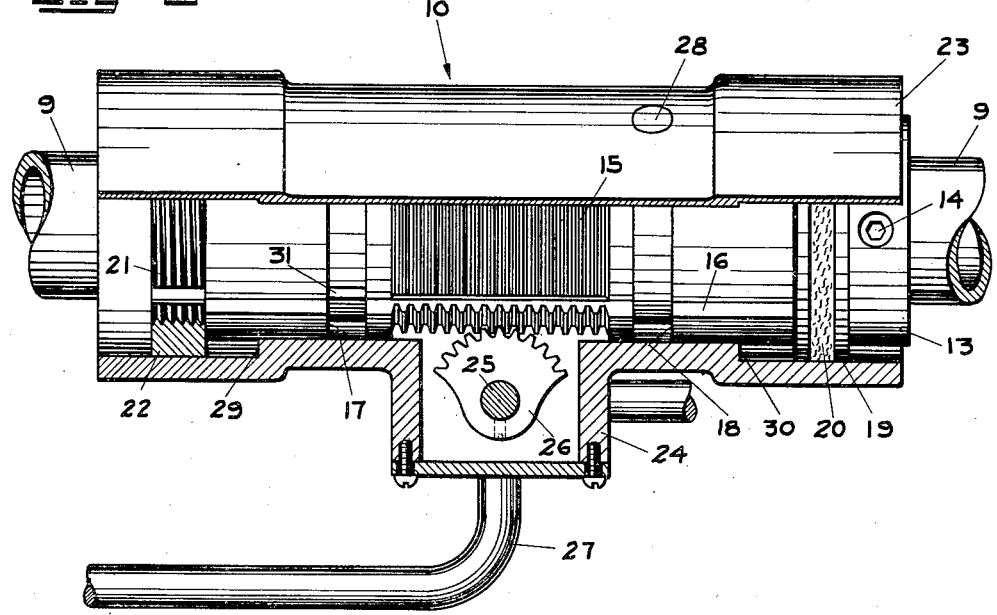
Fig. 2 is a top plan view, partly in section, of a template holder embodying my invention.

Referring principally to Fig. 2, the template holder 10 preferably comprises an inner sleeve 13 adapted to be fixed to the arm 9 as by the set screw 14 illustrated. The sleeve 13 has at the mid-portion thereof a rack gear 15 which extends around the circumference of the sleeve except for places in which it is interrupted by longitudinal grooves in the sleeve. I have shown four such longitudinal grooves, designated 16, Fig. 3, which extend substantially the length of the inner sleeve 13 and are spaced 90° apart around the circumference of the sleeve. The sleeve 13 also contains a pair of annular grooves 17 and 18 which extend around the circumference of the sleeve, one such groove being situated at each side of the rack gear 15. At one end of the sleeve 13 is a bearing 19 which preferably contains a felt grease wiper 20. The other end of the sleeve 13 preferably has screw threads 21 to which a bearing ring 22 may be threadedly engaged.

An outer sleeve 23 is fitted over the inner sleeve 13 and is movable thereon. In assembling the device, the outer sleeve 23 is placed over the inner sleeve 13 and secured thereon by applying the bearing ring 22 to the threaded portion 21 of the inner sleeve 13.

The outer sleeve 23 has a protruding boss 24 at one side thereof, preferably integral therewith. Mounted for rotation within the boss 24 is a shaft 25 to which is secured a gear segment 26. The teeth of the gear segment 26 mesh with the teeth of the rack gear 15. Hence rotation of the gear segment 26 moves the outer sleeve 23 longitudinally on the inner sleeve 13. A handle member 27 is secured to the shaft 25 to facilitate rotation of the shaft and the gear segment 26.

Figure 3:
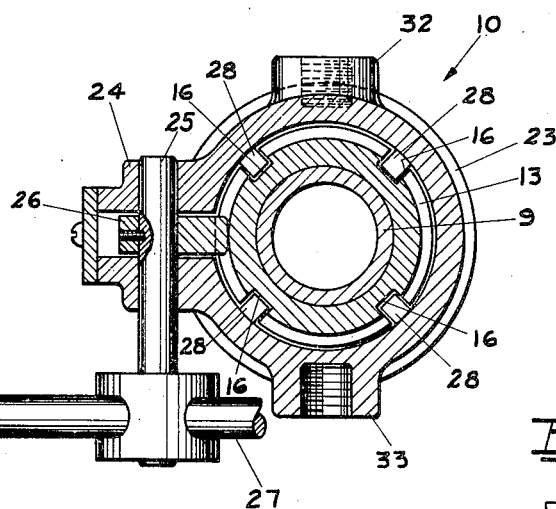
Fig. 3 is a vertical cross sectional view of the template holder taken substantially on the line 3—3, Fig. 1.

A plurality of guide pins 28, Fig. 3, are secured to the outer sleeve 23 and protrude from the inner surface thereof. The guide pins 28 are positioned in such a manner that they may slide through either the longitudinal grooves 16 or the annular grooves 17 and 18 in the inner sleeve 13. Preferably four guide pins 28 are utilized in the device to cooperate with the four longitudinal grooves 16 in the inner sleeve 13. Two such guide pins 28 are positioned so that they may slide through the annular groove 17 and are on diametrically opposite sides of the outer sleeve 23. Two other such guide pins 28 are positioned so that they may slide through the annular groove 18 and are on diametrically opposite sides of the outer sleeve 23, but 90° removed from the pins that slide through the groove 17. The guide pins 28 cooperating with the grooves 16, 17 and 18 thus guide longitudinal and rotary movement of the outer sleeve 23 on the inner sleeve 13.

The distance through which the outer sleeve 23 may slide on the inner sleeve 13 is limited by engagement of the bearing ring 22 on the edge 29 of a counterbore in one end of the outer sleeve 23 and by engagement of the bearing 19 on the edge 30 of a second counterbore in the opposite end of the outer sleeve 23.

To limit rotary movement of the outer sleeve 23 on the inner sleeve 13 a pair of stops 31, Fig. 2, are fixed in the annular grooves 17 and 18 respectively adjacent certain of the intersections with the longitudinal grooves 16 to cooperate with the pins 28. The other stop, not shown, is located on the opposite side of the groove 18 in position to cooperate with the pin 28 on that side.

The upper and lower walls of the outer sleeve 23 have protruding bosses 32 and 33 respectively. The bosses 32 and 33 are adapted to support templates 11 and 12. The bosses 32 and 33 are longitudinally offset from each other by a distance approximately equal to the longitudinal distance which the outer sleeve 23 may travel over the inner sleeve 13.

The templates 11 and 12 have supporting shanks that are threaded in tapped openings in the bosses 32 and 33. The templates are adapted to be removed from the template holder and replaced with templates of different shapes and sizes as desired. The templates may be either exterior templates as shown or interior templates. The apparatus is particularly useful with templates such as those illustrated which are stamped or cut from plate-like material so that their contour may be roughly described as lying generally in a plane.

*Operation*

When it is desired to employ the machine for cutting shapes from material, the machine is placed over the material so that the cutting element is adjacent one edge of the material. The oxyacetylene cutting element 5 is lighted and the flame properly adjusted through suitable mechanism provided for that purpose. The motor 6 is started and the magnetic roller 8 is energized. The chosen size and shape of template is attached to one or both of the bosses 32 and 33. The outer sleeve 23 is moved longitudinally in either direction to the limit of its path of travel on the inner sleeve 13.

With the machine thus set up to start operation, the handle 27 is turned slowly to move the outer sleeve 23 along the inner sleeve 13 to the opposite end of its path of travel. The movement is effected by rotation of the gear segment 26, the teeth of which mesh with the teeth of the rack gear 15. The movement is constrained to a straight longitudinal movement by the engagement of the pins 28 within the grooves 16.

Figure 4:
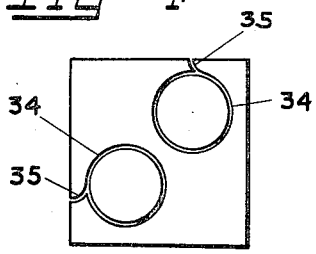
Fig. 4 illustrates the paths for cutting circular shapes when the template holder of my invention is used in the cutting machine.
Figure 5:
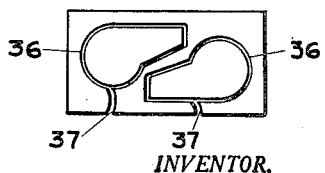
Fig. 5 illustrates the paths for cutting certain irregular shapes when the template holder of my invention is employed.

As the outer sleeve 23 travels longitudinally, it carries the templates 11 and 12 along with it. The roller 8 is held tightly against the template by magnetic attraction and at the same time rotation of the roller 8 moves the roller along the bearing surface of the template. When the sleeve 23 reaches the limit of its travel, the roller 8 has reached the predetermined position from which, by continuing to follow the bearing surface of the template, it begins to guide the cutting element to cut a shape identical with the shape of the template. The motion of the follower roller 8 from this predetermined position is substantially confined to rotation about its own axis and rolling along the contour of the template without any additional translation, since the template has at this point ceased to translate. The movement of the template slowly into position to start the cut while the roller is acting on the template results in a spiral cut being made from the edge of the material to the point at which the start of the cut of the shape of the template is reached. There is thus no abrupt change of direction of cutting at this point and the "starting nick" is eliminated. Figs. 4 and 5 illustrate the shape of cuts made in the material at the approach to the shape being cut out.

Fig. 4 illustrates the configuration of cuts made when two circular shapes are cut from a plate of material. The portions 34 of the cuts are the outlines of the desired shapes. The portions 35 of the cuts are the approach cuts through the salvage material.

Fig. 5 shows another typical shape which may be cut by the use of the appropriate templates. The portions 36 of the cuts are the outlines of the shapes. The portions 37 are the approach cuts through the salvage material.

When it is desired to employ a template secured to the boss 32 on the upper side of the sleeve 23, the sleeve 23 is first moved to mid-position on the inner sleeve 13. At this position the pins 28 are aligned with the annular grooves 17 and 18. The outer sleeve 23 is then rotated 180° with respect to the inner sleeve 13. Engagement of one of the pins 28 with one of the stops 31 prevents rotation in excess of that amount. The teeth of the gear segment 26 follow the teeth of the rack gear 15 during such rotation, since the latter extend around the circumference of the inner sleeve 13.

Such rotation moves the template 11 secured to the boss 32 to a position to cooperate with the magnetic roller 8. The outer sleeve 23 may be moved longitudinally of the inner sleeve 13 as before to produce a spiral approach to the cut of the desired shape.

The use of the second template makes it possible to make two cuts of many types of shapes without moving either the machine or the material between cuts. For example, two shapes of the type shown in Fig. 5 may be cut merely by rotating the outer sleeve 23 and otherwise operating the machine in the manner described. Cutting the shapes in the manner shown in Fig. 5, while it requires the use of a right hand template and a left hand template, otherwise of the same shape, eliminates considerable wastage of material, since heretofore the shapes could not be "stacked" as they are by use of my invention.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A template holder comprising a hollow cylindrical inner sleeve adapted to be fixed to a cutting machine and having a rack gear, the teeth of which extend substantially around the circumference of the sleeve, said sleeve having longitudinal grooves extending substantially the length of the sleeve and annular grooves extending around the circumference of the sleeve, a hollow cylindrical outer sleeve mounted on said inner sleeve for longitudinal and rotary movement thereon and having a protruding boss at one side thereof, a gear segment pivoted in said boss and engageable with said rack gear whereby rotation of the gear segment moves the outer sleeve longitudinally relative to the inner sleeve, means for rotating the gear segment, inwardly protruding pins secured in said outer sleeve and engageable with said longitudinal grooves to guide longitudinal movement of said outer sleeve and with said annular grooves to guide rotation of said outer sleeve, and a pair of bosses adapted to support templates on said outer sleeve on opposite sides thereof whereby rotation of said outer sleeve may place either of said last named bosses in operative position so that a template supported thereby may cooperate with a cutting machine.

2. A template holder comprising a hollow cylindrical inner sleeve adapted to be fixed to a cutting machine, a hollow cylindrical outer sleeve mounted on said inner sleeve for longitudinal and rotary movement thereon, cooperating means on said sleeves for moving said outer sleeve longitudinally of said inner sleeve, means on one of said sleeves cooperating with portions of the other sleeve to guide longitudinal and rotary movement of said outer sleeve on said inner sleeve, and a plurality of template supporting means on said outer sleeve selectively movable by rotation of the outer sleeve to positions to support a template in cooperative relation to a cutting machine.

3. The combination with a cutting machine of the type having a movable cutting element in which the path of movement of the cutting element is controlled by a roller acting on a template, of a template holder comprising an inner sleeve secured to the machine, an outer sleeve mounted on said inner sleeve for longitudinal and rotary movement thereon, cooperating means on said sleeves for moving said outer sleeve longitudinally of said inner sleeve, means on one of said sleeves cooperating with portions of the other sleeve to guide longitudinal and rotary movement of said outer sleeve, and a plurality of template supporting means on said outer sleeve selectively movable by rotation of the outer sleeve to positions to support a template in cooperative relation to the roller on the cutting machine.

4. The combination with a cutting machine of the type having a movable cutting element in which the path of movement of the cutting element is controlled by a roller acting on a template, of a template holder comprising an element fixed relative to the cutting machine, an element mounted on said fixed element and movable relative thereto, and a plurality of template supporting means on said movable element adapted selectively to support a template in position to cooperate with the roller on the cutting machine.

CLARENCE P. AGER.

REFERENCES CITED

The following references are of record in the file of this patent:

UNITED STATES PATENTS

| Number | Name | Date |
| --- | --- | --- |
| 1,352,760 | Plumley | Sept. 14, 1920 |
| 1,423,289 | Worner | July 18, 1922 |
| 1,553,467 | Otto et al. | Sept. 15, 1925 |
| 1,582,033 | Godfrey | Apr. 27, 1926 |
| 1,658,927 | Krebs | Feb. 14, 1928 |
| 1,759,857 | Krebs | May 27, 1930 |
| 1,777,497 | Krebs | Oct. 7, 1930 |
| 1,807,989 | Krebs | June 2, 1931 |
| 1,956,505 | Horner | Apr. 24, 1934 |
| 2,025,082 | Anderson et al. | Dec. 24, 1935 |
| 2,048,935 | Klages | July 28, 1936 |
| 2,178,938 | Ohmstede | Nov. 7, 1939 |
| 2,190,360 | Howard | Feb. 13, 1940 |
| 2,202,133 | Young | May 28, 1940 |
| 2,401,803 | Turchan et al. | June 11, 1946 |

FOREIGN PATENTS

| Number | Country | Date |
| --- | --- | --- |
| 438,940 | Great Britain | Nov. 26, 1935 |